(12) United States Patent
Kornfält et al.

(10) Patent No.: US 7,820,287 B2
(45) Date of Patent: Oct. 26, 2010

(54) PROCESS FOR THE PRODUCTION OF A FLOOR STRIP

(75) Inventors: Sven Kornfält, Malmö (SE); Per Bengtsson, Ekeby (SE); Hans Sjölin, Perstorp (SE)

(73) Assignee: Pergo AG, Baar (CH)

( * ) Notice: Subject to any disclaimer, the term of this patent is extended or adjusted under 35 U.S.C. 154(b) by 1636 days.

(21) Appl. No.: 10/895,329

(22) Filed: Jul. 21, 2004

(65) Prior Publication Data

US 2004/0258907 A1 Dec. 23, 2004

Related U.S. Application Data

(60) Division of application No. 10/360,802, filed on Feb. 10, 2003, now Pat. No. 6,805,951, which is a continuation of application No. 08/817,391, filed as application No. PCT/SE95/01206 on Oct. 17, 1995, now Pat. No. 6,517,935.

(30) Foreign Application Priority Data

Oct. 24, 1994 (SE) .................................... 9403620

(51) Int. Cl.
*B32B 5/16* (2006.01)
(52) U.S. Cl. .................................... 428/332; 428/292.4
(58) Field of Classification Search .................. None
See application file for complete search history.

(56) References Cited

U.S. PATENT DOCUMENTS

| 1,357,713 A | 11/1920 | Lane |
| 1,576,527 A | 3/1926 | McBride |
| 1,736,539 A | 11/1929 | Lachman |
| 1,966,020 A | 7/1934 | Rowley |
| 2,100,238 A | 11/1937 | Burgess |
| 2,194,086 A | 3/1940 | Horn |
| 2,363,429 A | 11/1944 | Lowry |
| 2,758,044 A * | 8/1956 | Terry .......................... 428/535 |
| 2,875,467 A * | 3/1959 | DeVault .......................... 16/7 |
| 2,926,401 A | 3/1960 | Place |
| 2,996,751 A | 8/1961 | Roby et al. |
| 3,028,938 A | 4/1962 | Schorr |
| 3,162,906 A | 12/1964 | Dudley |
| 3,199,258 A | 8/1965 | Jentoft et al. |

(Continued)

FOREIGN PATENT DOCUMENTS

BE 1010487 A6 10/1998

(Continued)

OTHER PUBLICATIONS

Search Report for PCT/US04/43953.

(Continued)

*Primary Examiner*—Edmund H. Lee
(74) *Attorney, Agent, or Firm*—Novak Druce & Quigg LLP

(57) ABSTRACT

A thin abrasion resistant decorative thermosetting laminate of postforming quality is glued to a longitudinal carrier. The carrier preferably consists of a fiber board or a particle board with a rectangular cross section and at least two opposite rounded-off edges. One or more floor strips with the same or different cross section is machined from the laminate clad carrier.

6 Claims, 4 Drawing Sheets

U.S. PATENT DOCUMENTS

Figure 1:
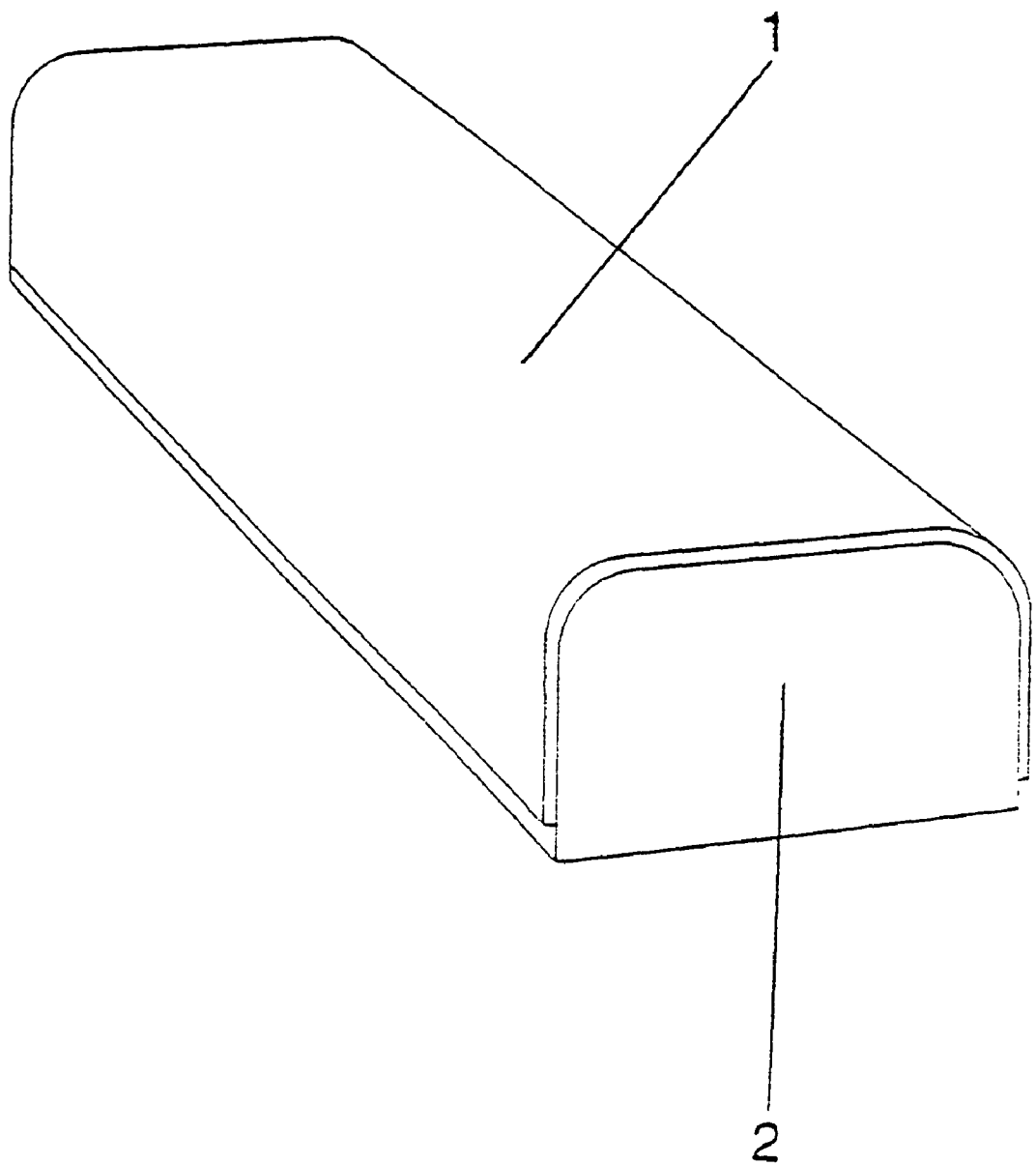

| Number | | Date | Name |
|---|---|---|---|
| 3,286,425 | A | 11/1966 | Brown |
| 3,296,056 | A * | 1/1967 | Bechtold .................... 156/461 |
| 3,298,056 | A | 1/1967 | Bechtold |
| 3,329,329 | A | 7/1967 | Berg |
| 3,331,171 | A | 7/1967 | Hallock |
| 3,339,329 | A | 9/1967 | Berg |
| 3,362,127 | A | 1/1968 | McGowan |
| 3,363,382 | A | 1/1968 | Forest |
| 3,430,402 | A * | 3/1969 | Gaiser ...................... 52/287.1 |
| 3,488,828 | A | 1/1970 | Gallagher |
| 3,501,879 | A * | 3/1970 | Roach et al. ................. 52/198 |
| 3,508,369 | A | 4/1970 | Tennison |
| 3,570,205 | A | 3/1971 | Payne |
| 3,665,666 | A | 5/1972 | Delcroix |
| 3,670,470 | A | 6/1972 | Thom |
| 3,671,369 | A | 6/1972 | Kavlheim et al. |
| 3,696,461 | A | 10/1972 | Kelly |
| 3,696,575 | A | 10/1972 | Armstrong |
| 3,745,726 | A | 7/1973 | Thom et al. |
| 3,758,650 | A | 9/1973 | Hurst |
| 3,760,544 | A | 9/1973 | Hawes et al. |
| 3,810,707 | A | 5/1974 | Tungseth et al. |
| 3,928,706 | A * | 12/1975 | Gibbons .................... 428/323 |
| 3,953,661 | A | 4/1976 | Gulley |
| 4,059,933 | A | 11/1977 | Funk et al. |
| 4,067,155 | A | 1/1978 | Ruff et al. |
| 4,198,455 | A | 4/1980 | Spiro et al. |
| 4,292,774 | A | 10/1981 | Mairle |
| 4,445,306 | A | 5/1984 | Schauffele |
| 4,455,803 | A | 6/1984 | Kornberger |
| 4,461,131 | A | 7/1984 | Pressell |
| 4,504,347 | A | 3/1985 | Munk et al. |
| 4,520,062 | A | 5/1985 | Ungar et al. |
| 4,594,347 | A | 6/1986 | Ishikawa et al. |
| 4,643,237 | A | 2/1987 | Rosa |
| 4,653,138 | A | 3/1987 | Carder |
| 4,698,258 | A * | 10/1987 | Harkins, Jr. ................. 442/373 |
| 4,736,563 | A | 4/1988 | Bilhorn |
| 4,747,197 | A | 5/1988 | Charron |
| 4,757,657 | A | 7/1988 | Mitchell |
| 4,806,435 | A | 2/1989 | Athey |
| 4,940,503 | A | 7/1990 | Lindgren |
| 5,034,272 | A | 7/1991 | Lindgren et al. |
| 5,074,089 | A | 12/1991 | Kemmer et al. |
| 5,155,952 | A | 10/1992 | Herwegh et al. |
| 5,365,713 | A | 11/1994 | Nicholas et al. |
| 5,581,967 | A | 12/1996 | Glatz |
| 5,657,598 | A | 8/1997 | Wilbs et al. |
| 5,688,569 | A | 11/1997 | Gilmore et al. |
| 5,695,875 | A * | 12/1997 | Larsson et al. .............. 428/326 |
| 5,706,623 | A | 1/1998 | Brown |
| 5,744,220 | A * | 4/1998 | Ringo ...................... 428/195.1 |
| 5,888,017 | A | 3/1999 | Corrie |
| 6,141,920 | A | 11/2000 | Kemper |
| 6,146,252 | A * | 11/2000 | Martensson .................. 451/44 |
| 6,158,915 | A | 12/2000 | Kise |
| 6,219,982 | B1 | 4/2001 | Eyring |
| 6,230,385 | B1 | 5/2001 | Nelson |
| 6,253,514 | B1 | 7/2001 | Jobe et al. |
| 6,345,480 | B1 | 2/2002 | Kemper |
| 6,421,970 | B1 | 7/2002 | Martensson et al. |
| 6,517,935 | B1 | 2/2003 | Kornfalt et al. |
| 6,550,205 | B2 | 4/2003 | Neuhofer |
| 6,588,165 | B1 | 7/2003 | Wright |
| 6,647,680 | B2 | 11/2003 | Daly et al. |
| 6,745,534 | B2 | 6/2004 | Kornfalt |
| 6,745,553 | B2 | 6/2004 | Raasch |
| 6,805,951 | B2 | 10/2004 | Kornfalt et al. |
| 6,860,074 | B2 | 3/2005 | Stanchfield |
| 6,898,911 | B2 | 5/2005 | Kornfalt et al. |
| 7,065,931 | B2 | 6/2006 | Kornfalt et al. |
| 2007/0125021 | A1 | 6/2007 | Thiers et al. |

FOREIGN PATENT DOCUMENTS

| | | | |
|---|---|---|---|
| CA | 991373 | | 6/1976 |
| DE | 2159042 | | 11/1971 |
| DE | 2238660 | | 2/1974 |
| DE | 2502992 | | 1/1975 |
| DE | 3041781 | | 6/1982 |
| DE | 3343601 | | 2/1983 |
| DE | 3544845 | | 6/1987 |
| DE | 3640822 | | 6/1988 |
| DE | 3932980 | | 3/1989 |
| DE | 467150 | | 6/1992 |
| DE | 502994 | | 3/1996 |
| DE | 29600057 | | 4/1996 |
| DE | 29618803 | | 2/1997 |
| DE | 29703962 | | 4/1997 |
| DE | 19951516 | | 10/1999 |
| DE | 19821938 | | 11/1999 |
| DE | 29920645 | | 3/2000 |
| DE | 20100413 | | 4/2002 |
| DE | 517353 | | 5/2002 |
| DE | 10131248 | | 1/2003 |
| EP | 0592013 | * | 8/1989 |
| EP | 1111155 | | 12/1999 |
| GB | 424057 | | 3/1935 |
| GB | 812671 | | 4/1959 |
| GB | 1348272 | | 4/1971 |
| GB | 1430423 | | 5/1974 |
| GB | 2088280 | | 6/1982 |
| GB | 2117813 | | 10/1983 |
| GB | 2256023 | | 11/1992 |
| JP | 3169967 | | 7/1991 |
| SE | 467150 B | | 6/1992 |
| SE | 501014 | | 10/1994 |
| SE | 9904533 | | 6/2001 |
| WO | WO 93/01378 | * | 1/1993 |
| WO | 9313280 | | 7/1993 |
| WO | 9401628 | | 1/1994 |
| WO | 9612857 | | 5/1996 |
| WO | 9822678 | | 5/1998 |
| WO | 9901628 | | 1/1999 |
| WO | 9901628 A | | 1/1999 |
| WO | 9966151 | | 12/1999 |
| WO | 0014351 | | 3/2000 |
| WO | 0120101 | | 3/2001 |
| WO | 0131141 | | 5/2001 |
| WO | 0131141 A1 | | 5/2001 |
| WO | 03016657 | | 2/2003 |
| WO | 03093686 | | 11/2003 |
| WO | 2005083195 | | 2/2004 |
| WO | 2005083196 | | 2/2004 |
| WO | 2005116364 | | 3/2005 |
| WO | 2005083196 | | 9/2005 |
| WO | 2005122667 | | 12/2005 |

OTHER PUBLICATIONS

Faus Group Catalog.
Pergo Original Catalog.
Ceiling Program.
Meister Panels; Meiste-Listen Schulte GmgH.
B.S. Bauprogram Handelsgesellschat mbH Catalog.
Formica Flooring Catalog; Formica Corporation; 1999.
Decades Laminate Flooring.
Marcaren Flooring Formica Corporation; 1998.
MagazineParkett; Feb. 1995.
Bob Vila's Workshop—the Ultimate Illustrated Handbook for the Home Workshop; Bob Vila.
Time Life Catalog; pp. 1-35; 1994.
Sweets Catalog File; Products for General Building and Renovation; McGraw Hill Information System Co.; Feb. 1986.
German Search Report.

"Original Pergo-The free and easy floor" (*Pergo Catalog*).
"Wohnkultur-von der Natur gestaltet" (*Haro Catalog*).
"Profiles in various kinds and innovative accessories" (*Neuhofer Holz Catalog*).
Search Report Dated Dec. 3, 2003 for PCT/IB02/04737.
U.S. Appl. No. 2003/0159389, published Aug. 28, 2003.
U.S. Appl. No. 2003/01118812, published Jun. 26, 2003.
U.S. Appl. No. 2002/0127374, published Sep. 12, 2002.
U.S. Appl. No. 2002/0189747, published Dec. 19, 2002.
U.S. Appl. No. 2004/0031226, published Feb. 19, 2004.
U.S. Appl. No. 2004/0031227, published Feb. 19, 2004.
U.S. Appl. No. 2002/0148551, published Oct. 17, 2002.
U.S. Appl. No. 2004/0041225, published Mar. 4, 2004.
U.S. Appl. No. 2003/0154678, published Aug. 21, 2003 with Office Action mailed Feb. 18, 2004.
U.S. Appl. No. 10/360,802, filed Feb. 10, 2003.
U.S. Appl. No. 2003/0159389, published Aug. 28, 2003.
International Search Report of PCT/SE95/01206 dated Nov. 21, 1995.
U.S. Appl. No. 2007/0079925 A1, published Apr. 12, 2007.
U.S. Appl. No. 10/319,820, filed Dec. 16, 2002.
Bob Vila, *Bob Vita's Workshop, The Ultimate Illustrated Handbook for the Home Workshop*: William Morrow and Company, Inc., New York, Syndicated Multimedia Corporation (1994), ISBN 0-688-11736-8, pp. 107-112.
Sweets Catalog File—Products for General Building and Renovation, Sweets Division, McGraw-Hill Information Systems Company (1998) McGraw-Hill, Inc.
*Fix it Yourself. Floor, Stairs & Carpets*, Time Life Books, St. Remy Press, ISBN0-378-01909-3, pp. 14-35, Jan. 1994.

\* cited by examiner

PROCESS FOR THE PRODUCTION OF A FLOOR STRIP

CROSS-REFERENCE TO RELATED APPLICATIONS

This application is a divisional application of U.S. application Ser. No. 10/360,802, filed Feb. 10, 2003, now U.S. Pat. No. 6,805,951 which, in turn, is a continuation application of U.S. application Ser. No. 08/817,391, filed Apr. 25, 1997, now U.S. Pat. No. 6,517,935 which, in turn is a §371 application of PCT/SE95/01206, filed Oct. 17, 1995, claiming the priority of Swedish Application No. 9403620-9, filed Oct. 24, 1994, the entire disclosures of which are incorporated herein in their entirety.

The present invention relates to a process for the production of a floor strip such as a dilatation profile, a transition profile or a finishing profile.

It is previously known to produce floor strips such as metal strips, wood veneer coated strips and strips of homogeneous wood.

There is a strong desire to bring about a floor strip with the same pattern as on a floor of thermosetting laminate. During the last years these floors have become very usual. For instance they are made with wood pattern, marble pattern and phantasy pattern. Possibly you can use a homogeneous wood strip or a wood veneer coated strip for a few of the wood patterned floors. Previously known strips do not go well together with all the other floor patterns.

In addition the purpose of the present invention is to provide a floor strip with improved abrasion resistance.

According to the present invention it has quite surprisingly been possible to meet the above needs and bring about a process for the production of floor strips such as a dilatation profile, a transition profile or a finishing profile. The process comprises gluing, preferably under heat and pressure a thin decorative thermosetting laminate of postforming quality having an abrasion resistance measured as IP-value >3000 revolutions, preferably >6000 revolutions, on a longitudinal carrier, which carrier preferably consists of a fibre board or a particle board with a rectangular cross-section and at least two opposite rounded-off edges. The postforming laminate is glued in one piece on the upper side and two long sides of the carrier via the rounded-off edges, whereupon one or more floor profiles having the same or different cross-section is machined from the laminate coated carrier.

According to one embodiment the carrier can be provided with a rectangular cross-section with three rounded-off edges.

One great advantage of the process or the production according to the invention is that it is very rational. From the same body, the laminate clad carrier, several profiles with varying shape can be machined. Usually a milling machine is used for machining the different kinds of profiles from the laminate coated carrier.

Preferably the carrier is water resistant. At a preferred embodiment the carrier consists of a high density fibre board made of fine fibres.

At a preferred embodiment the postforming laminate is glued in one piece on three of the four longitudinal sides of the carrier, preferably on the upper side and two long sides via the rounded-off edges. Advantageously, a hear and moisture resistant glue is used at the gluing. Preferably the gluing is carried out under heat and pressure. For instance the pressure can be regulated by means of rollers which press the laminate against the carrier. The temperature can for instance be regulated with heating nozzles which can give an even current of warm air.

At another embodiment the carrier can be provided with a rectangular cross-section and three rounded-off edges. The postforming laminate is then glued in one piece on all four sides of the carrier via the rounded-off edges.

Suitably the postforming laminate consists of at least one monochromatic or patterned paper sheer impregnated with a thermosetting resin, preferably melamine-formaldehyde resin and preferably one or more sheets for instance of parchment vulcanized fibres or glass fibres. The last mentioned sheets are preferably not impregnated with any thermosetting resin, but the thermosetting resin from the sheets situated above will enter these sheets at the laminating step, where all sheets are bonded together.

Generally the term postforming laminate means a laminate which is so flexible that it can be formed at least to a certain extent after the production thereof. Ordinary qualities of thermosetting decorative laminates are rather brittle and cannot be regarded as postforming laminates.

Usually the postforming laminate includes at least one uppermost transparent paper sheer made of $\alpha$-cellulose and impregnated with a thermosetting resin, preferably melamine-formaldehyde resin. This so-called overlay is intended to protect an underlying decor sheet from abrasion.

Often at least one of the paper sheets of the postforming laminate impregnated with thermosetting resin, preferably the uppermost one is coated with hard particles for instance silica, aluminium oxide and/or silicon carbide with an average particle size or about 1-80 µm, preferably about 5-60 µm evenly distributed over the surface of the paper sheet.

In a preferred embodiment the hard particles are applied on the resin impregnated paper surface before the resin has been dried.

The hard particles improve the abrasion resistance of the laminate. Hard particles are used in the same way at the production of laminates which are subject to a hard wear such as flooring laminates.

The abrasion resistance of the postforming laminates are tested according to the European standard EN 438-2/6:1991. According to this standard the abrasion of the decor sheet of the finished laminate to the so-called IP-point (initial point) is measured, where the starting abrasion takes place.

The IP-value suitably lies within the interval 3000-70000, preferably 3000-10000 revolutions.

Thus, the manufacturing process according to the invention makes it possible to produce laminate clad profiles with the same surface pattern and about the same abrasion resistance as the laminate floorings they are intended to no together with.

Of course the pattern of the profiles can also be adapted to other flooring materials than laminate floorings, such as parquette floorings and soft plastic floorings.

The present invention will be explained further in connection with the embodiment example below and the enclosed figures of which FIG. 1 shows a postforming laminate 1 glued to a longitudinal carrier 2.

Figure 2:
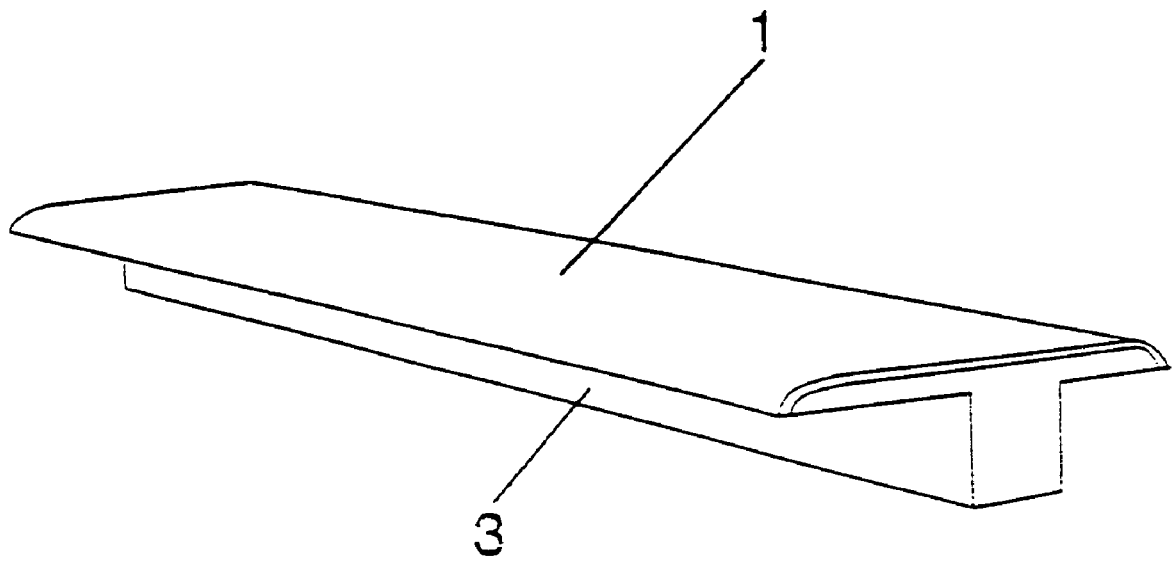
Figure 3:
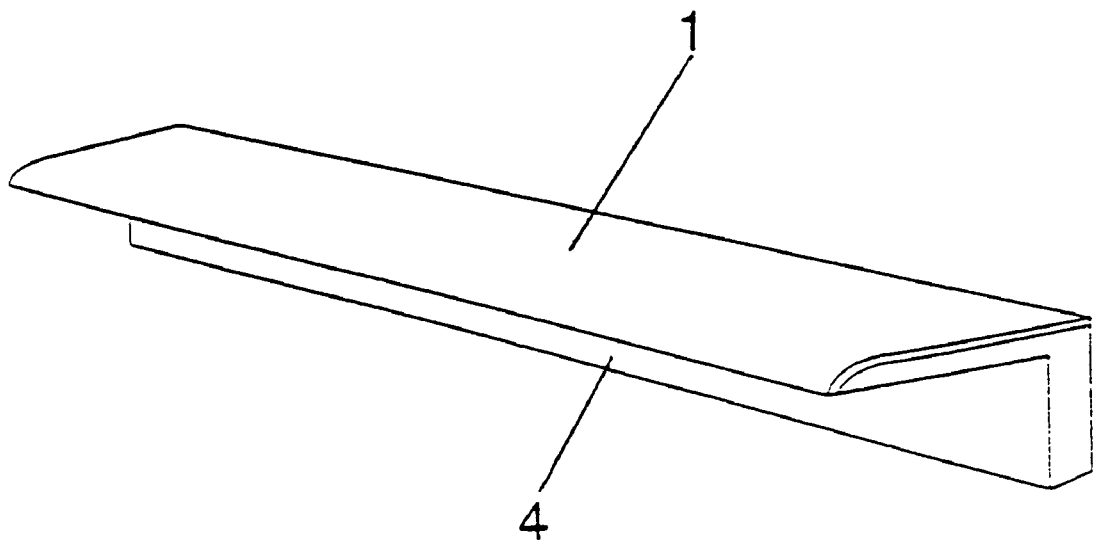
Figure 4:
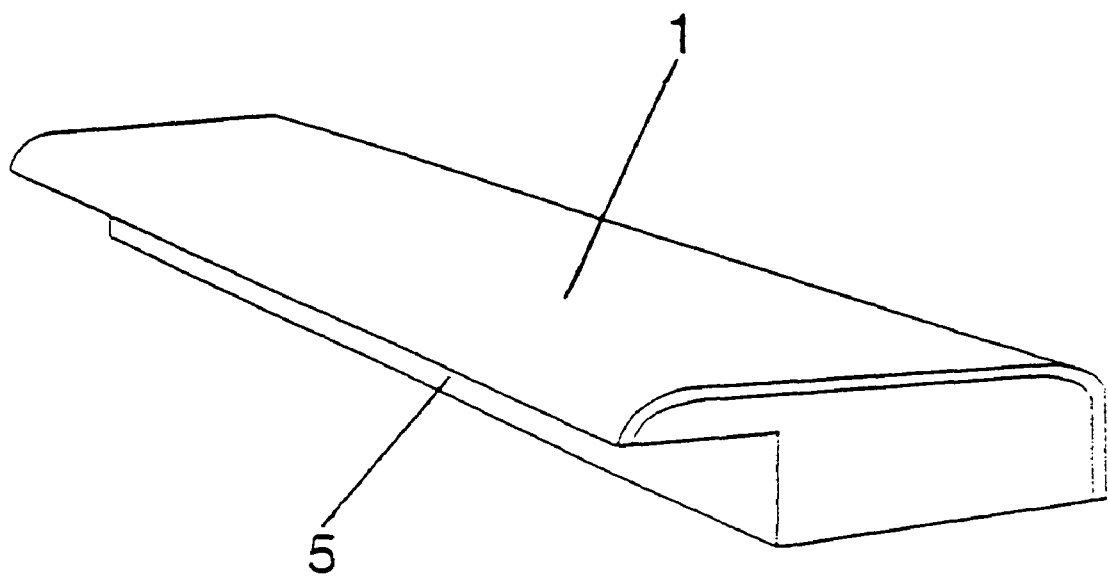

FIG. 2 shows a dilatation profile 3 with a postforming laminate 1 glued thereto, while FIG. 3 illustrates a finishing profile 4 with a postforming laminate 1 glued thereto. Finally FIG. 4 shows a transition profile 5 with a postforming laminate 1 glued thereto.

On the figures the thickness of the postforming laminate 1 has been magnified as compared to the size of the carrier 2 and the profiles 3-5 respectively to better illustrate that a postforming laminate 1 is glued to the carrier 2 and the profiles 3-5 respectively.

Of course the FIGS. 1-4 only show one embodiment of the carrier and the profiles 3-5 respectively which can be produced according to the invention. Various other designs are possible.

EXAMPLE

A oil of transparent so-called overlay paper of α-cellulose with a surface weight of 25 g/m$^2$ was impregnated with an aqueous solution of melamine-formaldehyde resin to a resin content of 70 percent by weight calculated on dry impregnated paper. Immediately after the impregnation, aluminium oxide particles with an average particle size of 50 μm were applied to the upper side of the paper in an amount of 7 g/m$^2$ by means of a doctor-roll placed above the paper web.

Thus, the hard aluminium particles were applied in the melamine-formaldehyde resin which had not been dried yet.

The impregnated paper web was then fed continuously into a heating oven, where the solvent was evaporated. At the same time the resin was partially cured to so-called B-stage. Thereby the aluminium oxide particles were enclosed in the resin layer and accordingly concentrated to the surface of the product obtained which is usually called prepreg. The prepreg web obtained was then rolled again.

A roll of conventional nontransparent so-called decor paper with a decor pattern printed thereon and having a surface weight of 80 g/m$^2$ was treated in the same way as the overlay paper except for the fact that no aluminium oxide particles were applied and that the resin content was 50 percent by weight calculated on dry impregnated paper.

A roll of unimpregnated parchment with a surface weight of 120 g/m$^2$ was used at the production of the postforming laminate.

The two prepreg webs impregnated with melamine-formaldehyde resin and the unimpregnated parchment web were pressed between two press bands of a continuous laminating press to a decorative postforming laminate.

At the pressing a prepreg web of α-cellulose was placed on top with the side with the hard particles directed upwards. Underneath followed a prepreg web of decor paper and at the bottom a web of parchment. The prepreg webs and the parchment web were pressed together at a pressure of 35 kp/cm$^2$ and at a temperature or 170° C.

The decorative postforming laminate obtained was cut with roller knives to strips of suitable length and width.

A longitudinal carrier 2 with a rectangular cross-section and two opposite rounded-off edges according to FIG. 1 was machined from a fibre board by means of a milling machine. The fibre board was a water resistant board of so-called MDF-quality (medium density fibre board quality) of high density made of finely divided fibres.

A strip of postforming laminate 1 was glued under heat and pressure to the longitudinal carrier 2 with a heat and moisture resistant glue. The pressure was regulated with rolls which pressed the laminate against the carrier and the temperature was regulated with heating nozzles which blew an even current of warm air.

A dilation profile 3 according to FIG. 2 was machined from the laminate clad carrier by milling.

Instead two finishing profiles 4 according to FIG. 3 or one transition profile 5 according to FIG. 4 can be produced from the same carrier. This results in a rational and cost-saving production.

The abrasion resistance of the postforming laminate obtained was measured. Then a value for the IP-point amounting to 7000 revolutions was obtained.

The present invention is not limited to the embodiments disclosed, since these can be modified in different ways within the scope of the present invention.

The invention claimed is:

1. The product produced by the process for the production of a floor profile strip, said process comprising gluing a thin decorative thermosetting laminate of postforming quality comprising hard particles on a longitudinal carrier, which carrier consists of at least one member selected from the group consisting of a fiber board and a particle board, said carrier having a cross-section with at least two rounded-off edges, wherein, in said gluing step, the thermosetting laminate of postforming quality in one piece is glued on an upper side and on two long sides of the carrier via the rounded-off edges to form a laminate coated carrier, and subsequently machining said laminate coated carrier into one or more floor profiles, which may be the same or different cross-section, from the laminate coated carrier to produce a floor profile strip.

2. A floor comprising the floor profile strip of claim 1 and at least one other flooring element.

3. The floor of claim 2, further comprising at least one floor element of thermosetting laminate, wherein the at least one floor element comprises a decorative upper surface, the decorative surface has at least one color and pattern and the thermosetting laminate of the floor profile strip comprises a decorative surface, wherein the decorative surface has at least one color and pattern corresponding to the at least one color and pattern of the decorative surface of the at least one other floor element.

4. A floor element comprising:
a longitudinal carrier, and
a thermosetting laminate affixed to said carrier,
wherein the floor element comprises glass fibers.

5. The floor element of claim 4, wherein the thermosetting laminate comprises glass fibers.

6. The product of claim 1, where the carrier has a rectangular cross-section with at least three rounded-off edges and the thermosetting laminate of postforming quality in one piece is glued on all four sides of the carrier via the rounded-off edges.

* * * * *